C. A. PALMGREN.
DRILL SOCKET ATTACHMENT FOR LATHES.
APPLICATION FILED FEB. 6, 1911.
1,050,385.
Patented Jan. 14, 1913.
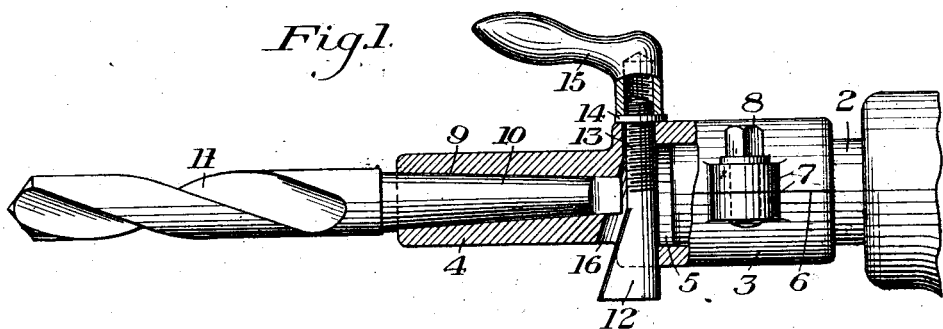
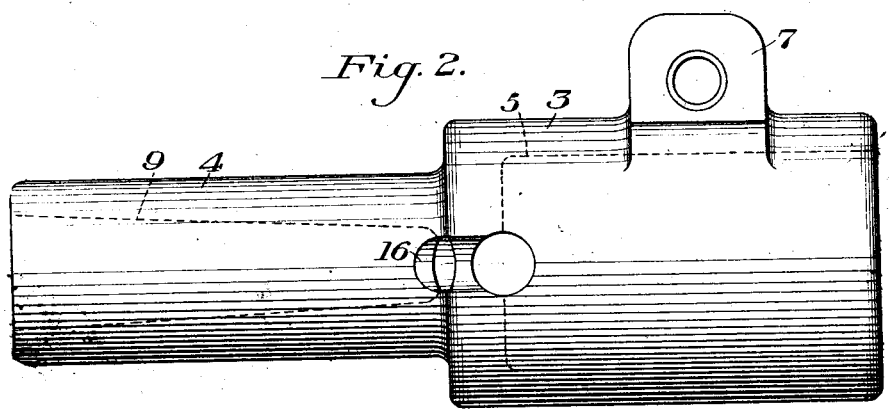
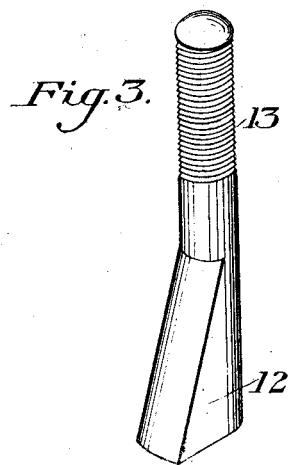
WITNESSES
INVENTOR
C. A. Palmgren.

UNITED STATES PATENT OFFICE.

CHARLES A. PALMGREN, OF CHICAGO, ILLINOIS.

DRILL-SOCKET ATTACHMENT FOR LATHES.

1,050,385. Specification of Letters Patent. Patented Jan. 14, 1913.

Application filed February 6, 1911. Serial No. 606,797.

*To all whom it may concern:*

Be it known that I, CHARLES A. PALMGREN, a resident of Chicago, in the county of Cook and State of Illinois, have invented a new and useful Improvement in Drill-Socket Attachments for Lathes, of which the following is a full, clear, and exact description, reference being had to the accompanying drawings, forming part of this specification, in which—

Figure 1 is a view partly in side elevation and partly in vertical section showing my improved attachment applied to a lathe; Fig. 2 is a side view of the socket member; and Fig. 3 is a perspective view of the tool loosening member.

My invention has relation to a drill socket attachment for lathes and is designed to provide a device of this character which can be quickly attached to and detached from the tail stock of an ordinary lathe and which can be used for holding drills, reamers, boring bars and other tools of like nature.

A further object of my invention is, to provide a device of this character which will be sufficiently rigid and firm to hold the tool securely in place without permitting it to jump or deflect from the position in which it is started.

A still further object is, to provide a tool loosening or pushing device of novel and effective character, by means of which the tool may be readily loosened and removed.

The nature of my invention will be best understood by reference to the accompanying drawings in which I have shown the preferred embodiment thereof, and which will now be described, it being premised, however, that various changes may be made in the detail of construction and arrangement of the parts by those skilled in the art without departing from the spirit and scope of my invention as defined in the appended claim.

In the drawings, the numeral 2 designates the tail stock of a lathe. 3, 4, designate a socket member, the portion 3 being preferably of larger diameter than the portion 4 and having therein a socket 5, open at its rear end to fit over the tail stock 2. This socket portion is split longitudinally, as shown at 6, and is provided with clamping lugs 7, to receive the bolt 8, by means of which the socket member may be quickly and firmly secured in place.

The portion 4 of the socket member has therein a tapered longitudinal socket 9 to receive the tapered shank 10 of the tool 11. The inner end of the shank 10 of the tool projects into the forward portion of the socket 5 in position to be engaged by the loosening or pushing member. This member consists of a wedge portion 12 and a threaded shank portion 13, the latter extending outwardly through an opening from one side of the socket member and having a washer 14 seated thereon.

15 is a nut having a handle portion, and which is arranged to engage the outer end of the threaded shank 13. When this nut is screwed up, it draws the wedge portion 12 upwardly into contact with the projecting end of the shank 10, and thereby forces the tool out of its socket. The forward or inner end wall of the socket 5 is tapered to receive this wedge portion, as shown at 16.

The attachment described is an exceedingly convenient one for use in machine shop practice, since it provides simple means whereby various tools may be quickly attached to and detached from the tail stock of a lathe, without removing the tail-stock center and without injury to the lathe, there being no driving out of tools.

What I claim is:

A tool holder having a tapered socket in one end thereof, there being a cylindrical socket in the other end, a dividing wall between said sockets, the shell forming the cylindrical socket being slotted from the end to the dividing wall, clamping lugs on the shell on each side of the slot, a clamping screw engaging said lugs, there being a radially disposed opening in the dividing wall opening into both sockets, a wedge member movably mounted in the radial opening, and a nut for moving said wedge; substantially as described.

In testimony whereof, I have hereunto set my hand.

C. A. PALMGREN.

Witnesses:
D. V. MEDALIE,
A. A. WILSON.